Ben B. Thigpen
INVENTOR.

BY Michael P. Breston
ATTORNEY

United States Patent Office 3,496,532
Patented Feb. 17, 1970

3,496,532
SYNCHRONIZED SEISMIC EXPLORATION SYSTEM
Ben B. Thigpen, Houston, Tex., assignor to Western Geophysical Company of America, Houston, Tex., a corporation of Delaware
Filed Mar. 4, 1969, Ser. No. 804,205
Int. Cl. G01v 1/26
U.S. Cl. 340—15.5      10 Claims

ABSTRACT OF THE DISCLOSURE

This invention generally relates to seismic prospecting systems having means for consecutively firing explosive charges underwater to generate seismic waves and for producing seismic records in synchronism with the firing means. The system includes fluid means for rapidly delivering explosively operated charges to an underwater firing station through a flexible conduit for subsequent detonation of the charges outside the firing station. Detector means are coupled to the conduit near the firing station for detecting the consecutive passages of the charge-filled canisters through the conduit and for generating timing signals which are used to suitably initiate recorders and analog or digital electronic geophysical processing equipment on the deck of the towing boat.

---

In marine geophysical prospecting the method most commonly employed includes the steps of periodically and rapidly generating in the water acoustic waves which in turn produce reflection waves characteristic of subsurface geological formations. Marine seismic energy sources include high explosives, gas-operated guns, pneumatic guns, sparkers, etc. Even though a charge of high explosives is still considered to be the "ideal" seismic energy source, it has been in the recent past largely replaced with the so-called "non-explosive" marine energy source. One of the reasons for the preference of non-explosive energy sources may be found in the fact that high explosives, particularly in large amounts, are unduly damaging to certain marine life and, consequently, there are now in many jurisdictions regulations forbidding the transport and handling of high explosive seismic charges.

Therefore, the seismic exploration industry has found it preferable to use nitro carbon nitrate (NCN) type seismic charges. These charges are assembled on deck of a seismic boat and may include a charge, a primer, and an electrically actuated detonator in the primer. Such charges are relatively large and are characterized by many well known drawbacks such as: damage to the fragile seismic streamer cable, safety hazards, special storage requirements, handling problems especially under unfavorable weather conditions, and occasional loss of the charges themselves.

More recently, an improved seismic energy source has been proposed for generating seismic disturbances in a body of water which provides small explosive charges into the water at relatively short-cycle times thereby avoiding the necessity for using large explosive charges. A preferred embodiment of such a system provides an underwater firing device with means to generate subsequent detonation outside of the firing device to preclude damage thereto. The firing station is towable through the water at a predetermined depth for rapidly and sequentially receiving, emplacing and initiating these small seismic charges and to deliver them outside of the firing device for detonation.

The flexible conduit means which convey the charge-filled canisters or cartridges from the deck of the boat to the firing station is made of a resilient material such as a fiber reinforced rubber or plastic tubing. This rubber tubing couples directly to a cartridge loader on deck for sequentially receiving and conveying individual cartridges to the firing mechanism underwater.

Since the initiation of the recording of the reflected seismic waves by recording equipment on the deck of the towing boat must be in time synchronism with the time of charge detonation, it is desired to detect the time of passage of a moving cartridge through the flexible conduit prior to its entering the firing mechanism without physically interfering with its movement through the conduit.

SUMMARY OF THE INVENTION

In accordance with this invention, the passage of a cartridge through the flexible conduit is detected "on-the-fly" electromagnetically by creating a magnetic field inside the conduit. The passage of the charge-filled canister through the magnetic field causes a change in the magnetic flux resulting in an electric signal at a time corresponding to the time of passage of the charge through the conduit.

In a preferred embodiment a detector coil is wound around the outer periphery of the conduit. The coil is connected to one arm of a tuned AC Wheatstone bridge. The change in the coil's magnetic flux caused by the passage of the cartridge unbalances the bridge and produces an output electric signal which is used to actuate certain switching and timing networks normally used in connection with electronic analog or digital seismic processing and recording equipment to ready such equipment for recording and processing of the reflected seismic signals subsequent to the firing and detonation of each seismic charge.

BRIEF DESCRIPTION OF THE DRAWINGS

Referring now to FIGURE 1, there is shown a firing system for generating seismic waves in a body of water by consecutively firing relatively small explosive charges. The firing system itself is described in copending patent application Ser. No. 673,594, filed Oct. 9, 1967, and forms no part of this invention. For an understanding of this invention, however, a brief description of the firing system will be given hereinafter.

Figure 1:
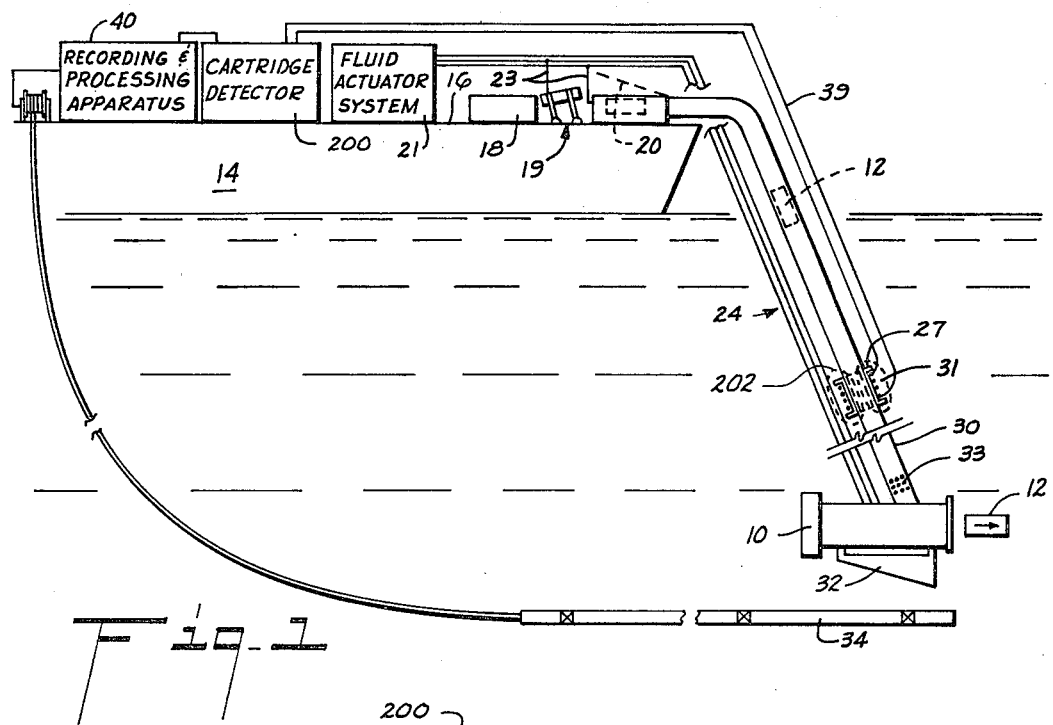
FIGURE 1 is a block diagram representation of a seismic system adapted to fire relatively small explosive operated charges at a predetermined depth below the surface of a body of water with automatic timing means for synchronizing the firing of the charges with the seismic recording and processing equipment on the deck of a seismic boat.

A firing device 10 is adapted to receive a percussion-initiatable explosive cartridge assembly 12. The cartridge 12 includes delay means such as a delay fuse which causes its charge to detonate at a distance removed from firing device 10. Firing device 10 is towed by a seismic boat 14 at a predetermined depth below the surface of the body of water. The directional stability of firing device 10 is maintained by suitable paravanes 32.

On deck 16 of boat 14 are positioned; a storage container 18 used to store a supply of the explosive cartridges; a cartridge loader generally designated as 19 having a hinged top closure 20 for receiving the charges from storage container 18; and a fluid actuator system 21 which includes water pumps, hydraulic pumps, air compressors, control valves, etc., for initiating the movement of each cartridge 12 and firing its charge in closely spaced time cycles. The fluid actuator system 21 is coupled to the cartridge loader 19 and to the firing device 10 through a plurality of fluid lines generally designated as 24.

A flexible conduit 30, which may be a rubber reinforced tube, couples the cartridge loader 19 to the firing device 10 and allows the percussion-initiatable seismic explosive cartridges to pass therethrough under the propulsion of water pressure. The cartridges are loaded into the loader 19 from the storage container 18 through the hinged top 20. Conduit 30 extends from loader 19 to below the water surface and into the firing device 10 and is towed together with lines 24 by boat 14.

Water is delivered from a water pump in the fluid actuator 21 into the rear end of loader 19 as indicated by lines 23, the water having sufficient pressure to cause each cartridge to move from loader 19 into conduit 30 for emplacement in a muzzled assembly (not shown) forming part of the inside of the firing device 10. As the cartridge 12 travels through conduit 30 it forces water already present in the conduit to expel through perforations 33 in the bottom wall of conduit 30 thereby facilitating the delivery and emplacement of each separate cartridge in the muzzled assembly.

A seismic streamer cable 34 is also towed through the water body by boat 14 to detect the acoustic reflection waves generated by the detonation of the charges outside the firing device 10. Streamer cable 34 converts the received reflected acoustic waves and converts them into corresponding electric signals which are recorded and processed on deck 16 by recording and processing equipment, generally designated as 40, including analog and/or digital seismic processing apparatus.

By way of illustration of the oepration of the firing system thus far described and illustrated in FIGURE 1, which system as previously mentioned forms no part of this invention, the firing mechanism 10 is towed beyond the seismic boat 14 at 6 to 10 knots per hour at a depth which may range from 10 to 50 feet below the water surface. An operator on deck 16 through suitable controls causes a cartridge assembly 12 to become loaded into loader 19, closes the hinged door 20, opens a valve in the actuator system 21 to allow water to flow through the delivery conduit 30 thereby moving the charge 12 under water pressure to the firing mechanism 10 for emplacement in the muzzled assembly. Water is expelled through the perforations 33 to faciltate such emplacement. The operator then stops the flow of water and actuates an air flow valve, upon command from the recorder in the system 40, which causes the firing pin in cartridge 12 to strike a percussion element thereby actuating the primer in the charge.

The cartridge is then ejected from firing mechanism 10 by the action therein of an air actuated piston. The detonation of the ejected charge 12 is delayed by a time-delay fuse until a distance of say 7 to 10 feet is established between the detonating charge and moving firing mechanism 10. The operator then moves both the hydraulic fluid and air control valves to their respective original positions for repeating the preceding cycle.

It will be appreciated that the system so far described depends on consecutively and rapidly detonating relatively small charges and that in such a system the synchronization of the firing cycle with the recording cycle must be critically maintained.

In accordance with this invention, this synchronization, in connection with the system shown in FIGURE 1, is accomplished by detecting on-the-fly the passage of a fluid-propelled cartridge assembly past a detector station locate on the flexible conduit 30 intermediate firing device 10 and loader 19.

Figure 2:
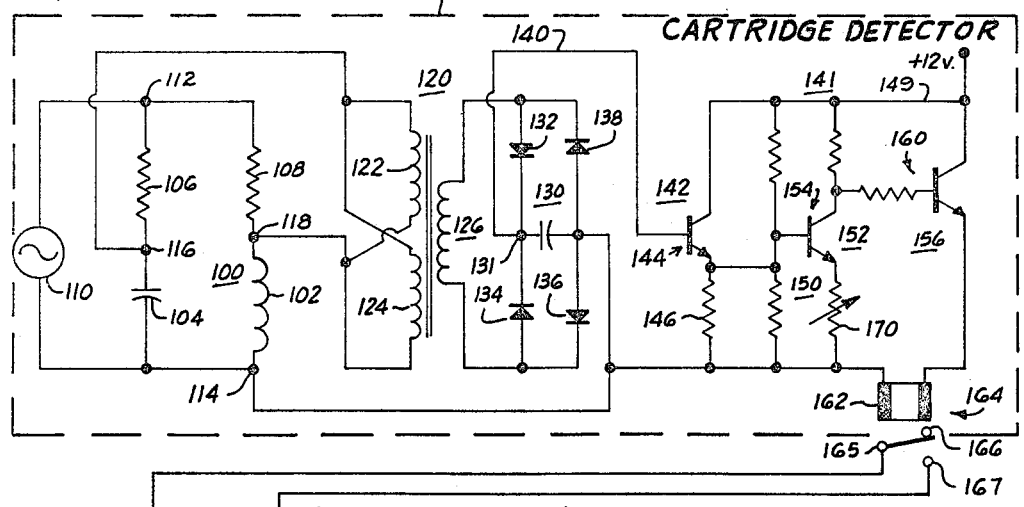
FIGURE 2 is a representation partly schematic and partly in block form of a preferred electromagnetic cartridge detector used in FIGURE 1 for detecting the time of passage of a cartridge through the conduit leading to the firing mechanism.

Referring now both to FIGURES 1 and 2, in the preferred embodiment of this invention the detection of the cartridge through conduit 30 is achieved electromagnetically by providing a detector circuit generally designated as 100 in the form of a Wheatstone AC bridge having in one of its arms a coil 102 and in the remaining arms a capacitor 104, a resistor 106 and another resistor 108. Coil 102 may be made of a thousand turns of insulated wire spaced on a mandrel 27 positioned around the outer periphery of conduit 30 at a detector station 31. Capacitance 104 may have a value of .1 microfarad and resistors 106 and 108 a value of 2000 ohms.

Bridge 100 is driven across a pair of diagonally opposed terminals 112, 114 by a high-frequency oscillator 110 which may be of conventional design. The frequency of oscillator 110 is adjusted so that capacitor 104 and coil 102, in the adjacent arms of bridge 100, form a tuned circuit. At resonance the reactive capacitive impedance is equal to the reactive inductive impedance but opposite in sign. Consequently, bridge 100 is balanced and no appreciable output signal appears across the other pair of diagonally opposite terminals 116, 118 of bridge 100. When on the other hand the bridge becomes unbalanced, a relatively large signal appears across the output terminals 116, 118. That output signal is fed to a step-up transformer 120 having two primary windings 122, 124 and a single secondary winding 126. The signal from bridge 100 then appears across the secondary winding 126. This signal is detected by a full-wave rectifier bridge 130 formed by four diodes 132–138, poled as shown. The detected rectified signal now appears at the output terminal 131 and is applied through a line 140 to a three-stage signal level detector and relay driver circuit generally designated as 141. The first stage 142 is a high-input impedance buffer amplifier having a transistor 144 in the emitter circuit of which is a high-valued resistor 146. The output signal of buffer 142 is fed to the base 150 of an amplifier stage 152 formed by a transistor 154. The third stage is a buffer amplifier 156 formed by a transistor 160 in the emitter circuit of which is a coil 162 of a relay 164 having terminals 165, 166 and 167. The output signal of amplifier 152 appearing at the collector of transistor 154 is applied to the base of transistor 160. In the emitter circuit of transistor 154 is an adjustable potentiometer 170 which is adjusted to a level such that the voltage normally appearing across relay coil 162 is insufficient to actuate the relay 164. The three-stage signal level detector is energized from a DC source, typically 12 volts, applied to the line 149, as shown. The relay terminals are in circuit with a switching and time-delay logic network 180 which controls via lines 181 the recording and processing equipment apparatus 40.

In operation of the cartridge detector system of this invention, generally designated as 200, as used in connection with the firing system shown in FIGURE 1, coil 102 is emplaced at the detector station 31 on the flexible conduit 30 and is connected through wires 39 to the cartridge detector which is positioned on deck 16 of boat 14. The frequency of oscillator 110 is then adjusted so that the output signal across terminals 116, 118 is a minimum which is indicative of resonance between coil 102 and capacitor 104. Coil 102 restablishes a magnetic field as indicated by flux lines 202 inside the volume of conduit 30 at the detector station 31. The canister carrying the charge and forming part of cartridge assembly 12 is of a magnetic material. When the canister passes through the air gap formed by the inner volume of coil 102 at the detector statoin 31, it disturbs the established magnetic field in the air gap, causing Wheatstone bridge 100 to become unbalanced thereby providing a relatively large output signal at its output terminals 116, 118. This signal is detected and rectified by bridge 130. The detected rectified signal at output terminal 131 is fed through: line 140, buffer stage 142, amplifier stage 152, and relay stage 156 to actuate coil 162 of relay 164. The actuation of relay 164 results in closing terminals 165, 167 thereby initiating the switching and time delay logic network 180. Network 180 provides the necessary timing signals on lines 181 to the recording and processing apparatus 40 for preparing it to receive the reflected electric seismic signals provided by streamer cable 34 subsequent to the detonation of charge 12 outside of firing device 10.

The timely detection of cartridge 12 through detector station 31 on conduit 30 while the cartridge is on-the-fly does not interfere with its passage from loader 19 to firing device 10. The signal produced by coil 102 synchronizes the recording and processing equipment 40 with the firing system as described herein and in said co-pending application. It has been found through extensive experimentation that the cartridge detecting system of the present invention is fully reliable and safe and is capable of operating without failure for relatively long periods of time even through adverse operating conditions.

What I claim is:

1. A seismic exploration system for generating seismic disturbances in a body of water and for detecting the reflected seismic signals caused thereby, said system comprising:
   storage means for storing a supply of explosively operated charges;
   a submersed firing device for receiving and initiating said charges;
   delivery means including a conduit for consecutively loading said charges from said storage means into said firing device and for delivering each initiated charge from said firing device for detonation outside said firing device;
   seismic processing apparatus including recording means for processing and recording said reflected seismic signals; and
   signal generating means coupled to said delivery means for detecting the passages of said charges through said delivery means and for generating electric signals corresponding with the times of such passages thereby synchronizing said exploration system.

2. The exploration system of claim 1 wherein said signal generating means include:
   electromagnetic means coupled to said conduit, and
   alternating frequency energizing means energizing said electromagnetic means thereby establishing a magnetic field through at least a portion of said conduit, said magnetic field being disturbed by said passages of said charges and such field disturbances causing said electric signals to become generated by said electromagnetic means.

3. The system of claim 2 wherein said conduit is of a non-magnetic material and said electromagnetic means include a coil of wire coupled with said conduit.

4. The system of claim 3 wherein said signal generating means further include a Wheatstone bridge having said coil in one of its arms.

5. The system of claim 4 wherein said Wheatstone bridge is a tuned AC bridge having a capacitor in another of its arms.

6. The system of claim 5 wherein said signal generating means further include:
   signal detector means coupled to the output of said Wheatstone bridge for detecting the signal generated by said Wheatstone bridge in response to an unbalance therein caused by the passage of a charge through said conduit.

7. The system of claim 6 wherein said generating means further include:
   amplifier means having an input stage coupled to said signal detector and an output stage, and
   a utilization device coupled to said output stage, said utilization device having one operative state when said Wheatstone bridge is balanced and another operative state when said Wheatstone bridge becomes unbalanced in response to a passage of a charge through said conduit.

8. The system of claim 7 and further including a time-delay logic network, and
   said utilization device being coupled to said network.

9. The system of claim 8 and further including a recording and processing apparatus, and
   said network being coupled to said apparatus to synchronize said apparatus with said firing device.

10. The system of claim 9 wherein said utilization device in a relay having terminals connected to said network.

References Cited

UNITED STATES PATENTS 2,849,076   8/1958   Kaufman _____ 340—15.5

RODNEY D. BENNETT, Jr., Primary Examiner

C. E. WANDS, Assistant Examiner

U.S. Cl. X.R.

340—7

UNITED STATES PATENT OFFICE
CERTIFICATE OF CORRECTION

Patent No. 3,496,532  Dated February 17, 1970

Inventor(s) Ben B. Thigpen

It is certified that error appears in the above-identified patent and that said Letters Patent are hereby corrected as shown below:

Column 2, line 50, "application Ser. No. 673,594, Filed October 9, 1967" should read -- application Ser. No. 724,942, Filed April 29, 1968, now Patent No. 3,509,959, --; column 3, line 30, "oepration" should read -- operation --; line 66, "locate" should read -- located --; column 4, line 54, "restablishes" should read -- re-establishes --; line 60, "statoin" should read -- station --; claim 10, line 2, "in" should read -- is --.

Signed and sealed this 19th day of December 1972.

(SEAL)
Attest:

EDWARD M. FLETCHER, JR.
Attesting Officer

ROBERT GOTTSCHALK
Commissioner of Patents